(12) United States Patent
Tong et al.

(10) Patent No.: US 11,855,487 B1
(45) Date of Patent: Dec. 26, 2023

(54) STATOR LIQUID COOLING STRUCTURE AND STATOR STRUCTURE OF STATOR YOKELESS DISC MOTOR

(71) Applicant: SHENYANG UNIVERSITY OF TECHNOLOGY, Shenyang (CN)

(72) Inventors: Wenming Tong, Shenyang (CN); Shengnan Wu, Shenyang (CN); Deyi Cai, Shenyang (CN); Jianguo Jia, Shenyang (CN); Zhitao Wu, Anshan (CN)

(73) Assignee: SHENYANG UNIVERSITY OF TECHNOLOGY, Shenyang (CN)

( * ) Notice: Subject to any disclaimer, the term of this patent is extended or adjusted under 35 U.S.C. 154(b) by 0 days.

(21) Appl. No.: 18/331,319

(22) Filed: Jun. 8, 2023

(30) Foreign Application Priority Data

Jun. 16, 2022 (CN) .......................... 202210678869.6

(51) Int. Cl.
*H02K 1/20* (2006.01)
*H02K 9/19* (2006.01)
*H02K 5/20* (2006.01)

(52) U.S. Cl.
CPC ................ *H02K 1/20* (2013.01); *H02K 5/20* (2013.01); *H02K 9/19* (2013.01)

(58) Field of Classification Search
CPC .. H02K 1/146–148; H02K 1/182; H02K 1/20; H02K 5/203; H02K 19/19;
(Continued)

(56) References Cited

U.S. PATENT DOCUMENTS

| | | | |
|---|---|---|---|
| 2011/0309726 A1* | 12/2011 | Carpenter | H02K 21/24 310/75 R |
| 2017/0025927 A1* | 1/2017 | Weerts | H02K 3/24 |

(Continued)

FOREIGN PATENT DOCUMENTS

| | | |
|---|---|---|
| CN | 204316259 U | 5/2015 |
| CN | 106411052 A | 2/2017 |

(Continued)

OTHER PUBLICATIONS

Machine translation of WO-2021058052-A1 (Year: 2021).*

*Primary Examiner* — Quyen P Leung
*Assistant Examiner* — Minki Chang
(74) *Attorney, Agent, or Firm* — Rachel Pilloff; Sean Passino; Martin Cosenza (57) ABSTRACT

A stator liquid cooling structure and a stator structure of a stator yokeless disc motor are provided. The cooling structure includes an annular stator bracket and a water jacket. An outer periphery of the stator bracket is in a groove structure and is fixedly connected with the water jacket. Opposite upper and lower ends of the water jacket are provided with a liquid inlet and a liquid outlet. The stator structure includes stator cores, an armature winding, the stator bracket and the water jacket. A first stator core and a second stator core of the stator cores are same in structure and oppositely arranged. The armature winding is wound on first stator tooth bodies and second stator tooth bodies of the stator cores; the first stator tooth bodies and the second stator tooth bodies are inserted into gaps between adjacent blade-shaped cavities and fixed on the stator bracket.

4 Claims, 7 Drawing Sheets

(58) Field of Classification Search
CPC .. H02K 21/026; H02K 21/24; H02K 21/2793; H02K 21/2796; H02K 21/2798; H02K 2201/12
See application file for complete search history.

(56) References Cited

U.S. PATENT DOCUMENTS

2022/0115924 A1\* 4/2022 Zhang ..................... H02K 1/20
2022/0393543 A1\* 12/2022 Goykhman ............. H02K 5/04

FOREIGN PATENT DOCUMENTS

| | | |
|---|---|---|
| CN | 113746232 A | 12/2021 |
| CN | 114024379 A | 2/2022 |
| CN | 114123567 A | 3/2022 |
| JP | 2013225976 A | 10/2013 |
| WO | WO-2021058052 A1 \* | 4/2021 ............. H02K 1/182 |

\* cited by examiner

STATOR LIQUID COOLING STRUCTURE AND STATOR STRUCTURE OF STATOR YOKELESS DISC MOTOR

CROSS-REFERENCE TO RELATED APPLICATIONS

This application claims priority to Chinese Patent Application No. 202210678869.6, filed on Jun. 16, 2022, the contents of which are hereby incorporated by reference.

TECHNICAL FIELD

The disclosure belongs to the technical field of disc motors, and particularly relates to a stator liquid cooling structure and a stator structure of a stator yokeless disc motor.

BACKGROUND

The stator yokeless disc motor is compact in structure and has high power density. The huge loss caused by the compact space easily leads to the high temperature rise of the armature winding and damage the insulation of the armature winding. Therefore, how to improve the heat dissipation capacity of the stator core and armature winding has become an urgent problem for technicians in this field.

In the prior art, the motor cooling system usually makes the cooling channel only contact with the armature winding, which often leads to poor cooling effects of the stator core, especially poor heat dissipation of stator tooth shoes.

SUMMARY

Aiming at the problem that the cooling technology of the existing high-power density disc permanent magnet motor is insufficient, the disclosure provides a stator liquid cooling structure and a stator structure of a stator yokeless disc motor.

The present disclosure provides following technical scheme.

The disclosure relates to a stator liquid cooling structure of a yokeless disc motor and the stator liquid cooling structure of the stator yokeless disc motor includes a stator bracket and a water jacket; the stator bracket is annular, and the stator bracket includes an annular groove arranged on an outer periphery of the stator bracket, radial cooling channel sheets, baffle plates, a second circumferential cooling channel disc and a third circumferential cooling channel disc. An outer periphery of the annular groove is fixedly connected with the water jacket and an annular space is formed between the annular groove and the water jacket. The annular space is a first circumferential cooling channel. Opposite upper and lower ends of the water jacket are provided with a liquid inlet and a liquid outlet; and the first circumferential cooling channel is provided with the baffle plates on both sides of an axis where a connecting line between the liquid inlet and the liquid outlet is located. The first circumferential cooling channel is divided into two cavities by two the baffle plates, one cavity is communicated with the liquid inlet and the other cavity is communicated with the liquid outlet. A plurality of the radial cooling channel sheets are arranged at a bottom of the annular groove in a circumferential array towards a center of circle direction, one end of each of the radial cooling channel sheets is communicated with the annular groove, and the other end of the each of the radial cooling channel sheets is closed. The second circumferential cooling channel disc and the third circumferential cooling channel disc are same in structure, are both annular disc structures, and are symmetrically arranged on both sides of the bottom of the annular groove. The second circumferential cooling channel disc and the third circumferential cooling channel disc both include a plurality of blade-shaped cavities arranged in a circumferential array along the second circumferential cooling channel disc and the third circumferential cooling channel disc, and ends of the blade-shaped cavities facing centers of circles of the second circumferential cooling channel disc and the third circumferential cooling channel disc are communicated, other ends of the blade-shaped cavities are fixed on both sides of the bottom of the annular groove, and the gaps exist between adjacent blade-shaped cavities. The blade-shaped cavities corresponding to the second circumferential cooling channel disc and the third circumferential cooling channel disc are communicated through the radial cooling channel sheets.

Optionally, the stator bracket and the water jacket are made of aluminum alloy.

Optionally, a connecting line between the liquid inlet and the liquid outlet and a connecting line between the two baffle plates are mutually equally divided and perpendicular.

A stator structure adopting the stator liquid cooling structure of the stator yokeless disc motor further includes stator cores and an armature winding. The stator cores include a first stator core and a second stator core. The first stator core and the second stator core have a same structure and are oppositely arranged. The first stator core is in an annular structure including a plurality of first stator tooth shoes and a plurality of first stator tooth bodies, and the first stator tooth bodies are integrally arranged on one side of the first stator tooth shoes facing the second stator core. The second stator core is in an annular structure including a plurality of second stator tooth shoes and a plurality of second stator tooth bodies, and the second stator tooth bodies are integrally arranged on one side of the second stator tooth shoes facing the first stator core. Both the first stator tooth bodies and the second stator tooth bodies are wound with the armature winding, and the first stator tooth bodies and the second stator tooth bodies wound with the armature winding are correspondingly inserted into the gaps between adjacent blade-shaped cavities in the stator liquid cooling structure of the stator yokeless disc motor.

Optionally, the stator cores are yokeless stator cores, and a material of the stator cores is one selected from a group consisting of oriented silicon steel sheet, non-oriented silicon steel sheet, soft magnetic composite material and amorphous alloy material, or two or more materials selected from the group are mixed to make the stator cores.

Optionally, the armature winding adopts concentrated winding.

The present embodiment has following beneficial effects.

According to the stator liquid cooling structure and the stator structure of the yokeless disc motor provided by the embodiment, cooling channels are arranged on the stator bracket, so that the cooling liquid contacts with the stator cores and the armature winding at the same time, thereby obviously improving heat dissipation capacity of the stator cores and the armature winding, and enhancing the safety of the motor. Meanwhile, with the enhancement of the cooling effect of the motor, the power density of the motor is improved. The embodiment improves the heat dissipation capacity of the stator cores and the armature winding of the motor, and increases the safety of the motor.

DETAILED DESCRIPTION OF THE EMBODIMENTS

The present embodiment will be further described with reference to the attached drawings.

Figure 1:
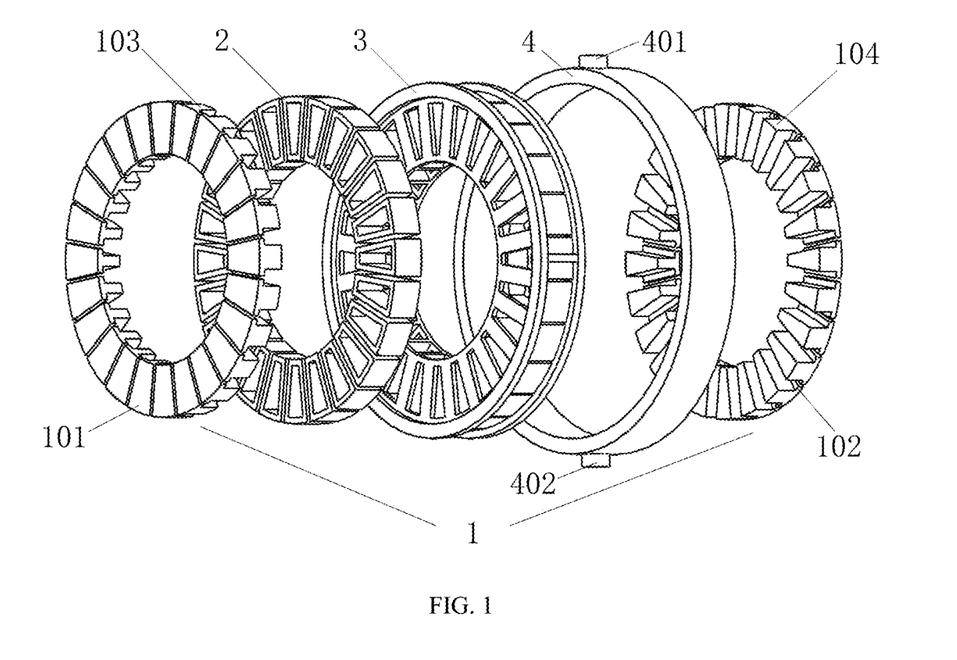
FIG. 1 is an exploded view of a stator structure according to the embodiment of the disclosure.
Figure 2:
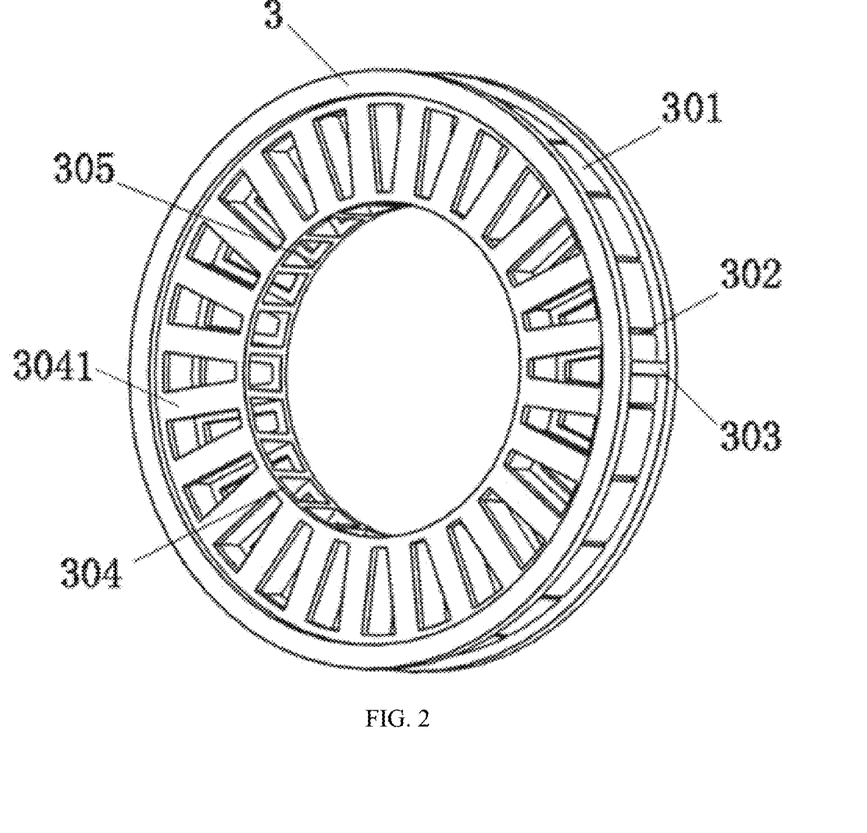
FIG. 2 is a schematic structural diagram of a stator bracket according to the embodiment of the present disclosure.
Figure 3:
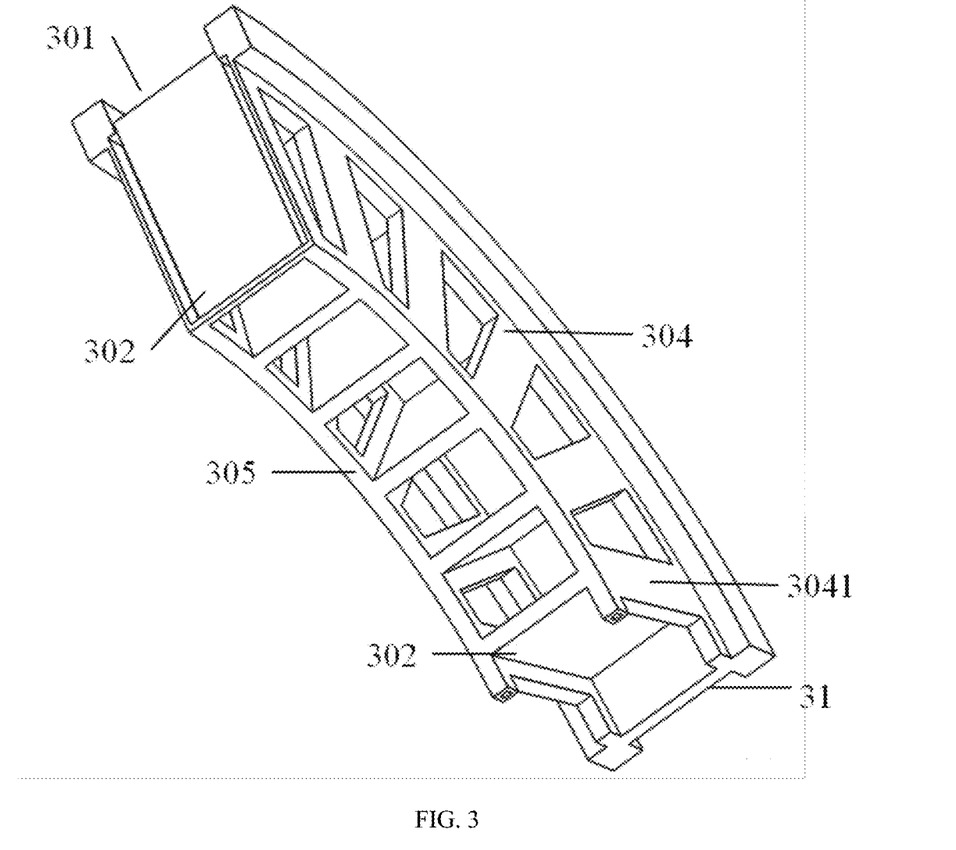
FIG. 3 is a schematic structural view of a cut-away stator bracket according to the embodiment of the present disclosure.

As shown in FIG. 1 to FIG. 3, a stator liquid cooling structure of a stator yokeless disc motor includes a stator bracket 3 and a water jacket 4. The stator bracket 3 is annular, and the stator bracket 3 includes an annular groove 31 arranged on an outer periphery of the stator bracket, radial cooling channel sheets 302, baffle plates 303, a second circumferential cooling channel disc 304 and a third circumferential cooling channel disc 305. An outer periphery of the annular groove 31 is fixedly welded with the water jacket 4. The annular groove 31 and the water jacket 4 may also be connected in other closed ways besides welding. An annular space is formed between the annular groove 31 and the water jacket 4, and the annular space is a first circumferential cooling channel 301. Opposite upper and lower ends of the water jacket 4 are provided with a liquid inlet 401 and a liquid outlet 402. As shown in FIG. 2, the first circumferential cooling channel 301 is provided with the baffle plates 303 on both sides of an axis where a connecting line between the liquid inlet 401 and the liquid outlet 402 is located. The two baffle plates 303 divide the first circumferential cooling channel 301 into two cavities, one of the cavities communicates with the liquid inlet 401 and the other cavity communicates with the liquid outlet 402. A plurality of the radial cooling channel sheets 302 are arranged at a bottom of the groove body of the annular groove 31 in a circumferential array towards a center of circle direction, one end of each of the radial cooling channel sheets 302 is communicated with the annular groove 31, and the other end of the each of the radial cooling channel sheets 302 is closed. The second circumferential cooling channel disc 304 and the third circumferential cooling channel disc 305 are same in structure, are both annular disc structures, and are symmetrically arranged on both sides of the bottom of the annular groove 31. Both the second circumferential cooling channel disc 304 and the third circumferential cooling channel disc 305 include a plurality of blade-shaped cavities 3041 arranged in an array along the second circumferential cooling channel disc and the third circumferential cooling channel disc, and ends of the blade-shaped cavities 3041 facing centers of circles of the second circumferential cooling channel disc and the third circumferential cooling channel disc are communicated. Other ends of the blade-shaped cavities 3041 are fixed on both sides of the bottom of the annular groove 31. In other words, the cooling liquid in the blade-shaped cavities 3041 only flows in through the radial cooling channel sheets 302, and there are gaps between adjacent blade-shaped cavities 3041, and the blade-shaped cavities 3041 corresponding to the second circumferential cooling channel disc 304 and the third circumferential cooling channel disc 305 are communicated through the radial cooling channel sheets 302. The first circumferential cooling channel 301, the radial cooling channel sheets 302, the second circumferential cooling channel disc 304 and the third circumferential cooling channel disc 305 are used for filling cooling liquid. The cooling liquid is added from the liquid inlet 401, passes through the first circumferential cooling channel 301, the radial cooling channel sheets 302, the second circumferential cooling channel disc 304 and the third circumferential cooling channel disc 305, and then flows into the radial cooling channel sheets 302 and the first circumferential cooling channel 301 and flows out from the liquid outlet 402.

As shown in FIG. 2, in this embodiment, a connecting line between the liquid inlet 401 and the liquid outlet 402 and a connecting line between the two baffle plates 303 are mutually equally divided and perpendicular. In other words, the stator liquid cooling structure of the stator yokeless disc motor of the present embodiment is equally divided into an upper half portion and a lower half portion. This arrangement is more conducive to the rapid and uniform filling of the first circumferential cooling channel 301, the radial cooling channel sheets 302, the second circumferential cooling channel disc 304 and the third circumferential cooling channel disc 305 by the cooling liquid, thus improving the heat dissipation efficiency.

The stator bracket 3 may be made of aluminum alloy. The aluminum alloy has the advantages of good strength, easy processing and good corrosion resistance, and the advantages of light weight of the aluminum alloy is conducive to realizing the lightweight of the motor, thus improving a power density and a torque density of the motor.

The water jacket 4 is also made of aluminum alloy. The water jacket is fixed on the outer side of the stator bracket and forms the first circumferential cooling channel 301 with the annular groove 31 of the stator bracket 3.

As shown in FIG. 1, a stator structure adopting a stator liquid cooling structure of a stator yokeless disc motor further includes stator cores 1 and an armature winding 2. In order to improve the efficiency of the cooling structure, the stator cores 1 include a first stator core and a second stator core, and the first stator core and the second stator core have the same structure and are oppositely arranged. The first stator core is in an annular structure including a plurality of first stator tooth shoes 101 and a plurality of first stator tooth bodies 103, and the first stator tooth bodies 103 are integrally arranged on one side of the first stator tooth shoes 101 facing the second stator core. The second stator core has an annular structure including a plurality of second stator tooth shoes 102 and a plurality of second stator tooth bodies 104, and the second stator tooth bodies 104 are integrally arranged on the side of the second stator tooth shoes 102 facing the first stator core. Both the first stator tooth bodies 103 and the second stator tooth bodies 104 are wound with the armature winding 2, and the first stator tooth bodies 103 and the second stator tooth bodies 104 wound with the armature winding 2 are correspondingly inserted into the gaps between adjacent blade-shaped cavities 3041 in the stator liquid cooling structure of the stator yokeless disc motor and are fixed on the stator bracket 3. A gap between stator cores 1, the armature winding 2 and the stator bracket 3 may be filled with epoxy resin, so that the stator cores 1 and the armature winding 2 are fixed more firmly; meanwhile, the heat transfer performance of the epoxy resin is superior to that of air. The heat transfer performance of the stator cores 1 and the armature winding 2 to the cooling channels may also be enhanced by filling the epoxy resin. The first circumferential cooling channel 301 in the stator liquid cooling structure of the stator yokeless disc motor is used to cool outer diameter parts of the motor stator cores 1 and the armature winding 2, the radial cooling channel sheets 302 are used to cool adjacent coils of the armature winding 2, and the second circumferential cooling channel disc 304 and the third circumferential cooling channel disc 305 are used to cool the whole stator cores 1 and the armature winding 2. The stator cores 1 are yokeless stator cores, and a material of the stator cores 1 is one selected from a group consisting of oriented silicon steel sheet, non-oriented silicon steel sheet, soft magnetic composite material and amorphous alloy material, or two or more materials selected from the group are mixed to make the stator cores 1.

The armature winding 2 adopts concentrated winding.

In the embodiment, the cooling liquid is one selected from water, transformer oil, a mixture of ethylene glycol and water, and other cooling liquids may also be selected.

When the motor works normally, the cooling liquid enters the upper half portion of the first circumferential cooling channel 301 from the liquid inlet 401. When the connecting line between the liquid inlet 401 and the liquid outlet 402 and the connecting line between the two baffle plates 303 are mutually equally divided and perpendicular, the two baffle plates 303 divide the first circumferential cooling channel 301 into the upper half portion and the lower half portion, as shown in in FIG. 2 with baffle plates 303 as divisions. Then the cooling liquid flows along the circumferential direction into the radial cooling channel sheets 302 between the coils of the armature winding 2, and then flows into the second circumferential cooling channel disc 304 and the third circumferential cooling channel disc 305 from the radial cooling channel sheets 302. After the cooling liquid flows through the upper half portion of the first circumferential cooling channel 301, the cooling liquid is blocked by the baffle plates 303. At this time, the cooling liquid flows from the second circumferential cooling channel disc 304 and the third circumferential cooling channel disc 305 to the radial cooling channel sheets 302 of the armature winding, then flows to the first circumferential cooling channel 301 through the radial cooling channel sheets 302, and finally flows out through the liquid outlet 402. The cooling liquid flowing through the channel is able to directly contact with the first stator tooth shoes 101, the second stator tooth shoes 103 and the armature winding 2, and is able to effectively take away the heat generated by the stator cores 1 and the armature winding 2.

A physical model of the motor is established by Solidworks software, and imported into SpaceClaim to obtain the internal fluid of the motor by establishing an air bag and using Boolean operation, and then imported into Mesh for grid meshing. The minimum orthogonality of the whole grid is greater than 0.1 and the maximum distortion is less than 0.98. After meshing, the physical model is imported into Fluent software for calculation. In Fluent software calculation, a default ambient temperature is 300 Kelvin (K), and heat generation rates of motor heating parts and a thermal conductivity of each part need to be specified. In this embodiment, the heat generation rate of stator cores is 6734494 W/m$^3$ (watt/cubic meter) and the heat generation rate of the armature winding is 12406102 W/m$^3$, the specified thermal conductivity of each part of the motor is shown in Table 1.

TABLE 1

Thermal conductivity of each part of the motor

| Parts | Thermal conductivity W/(m · K) | Parts | Thermal conductivity W/(m · K) |
| --- | --- | --- | --- |
| Stator cores (axial, circumferential) | 39 | Stator cores (radial) | 4.4.3 |
| Armature winding | 385 | Insulation | 0.26 |
| Stator bracket | 168 | Water jacket | 168 |
| Epoxy resin | 0.4 | Water | 0.6 |

Figure 4:
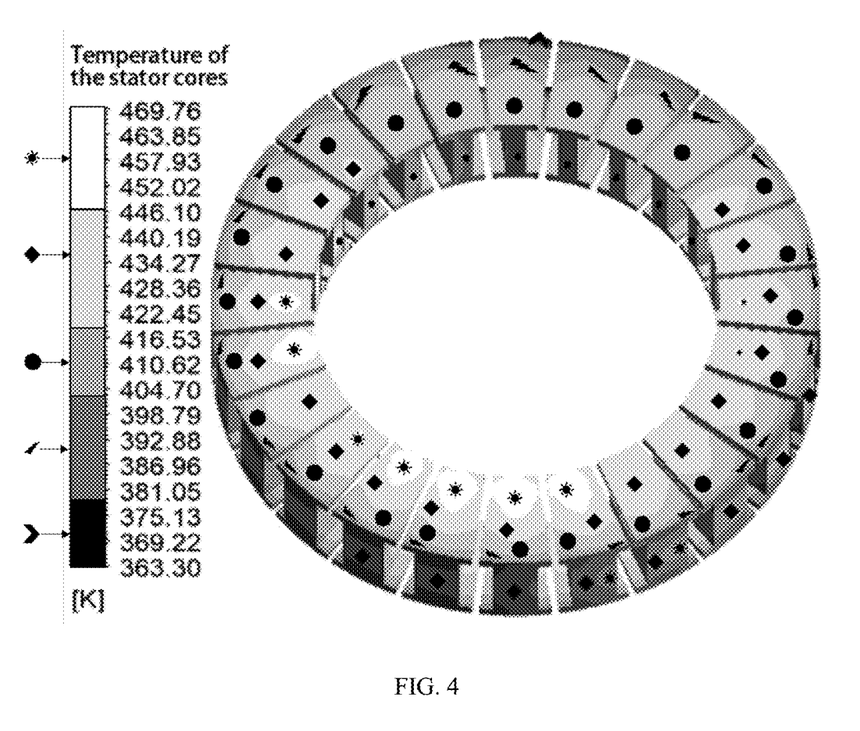
FIG. 4 shows a temperature distribution of stator cores of a motor when only a first circumferential cooling channel is provided.
Figure 5:
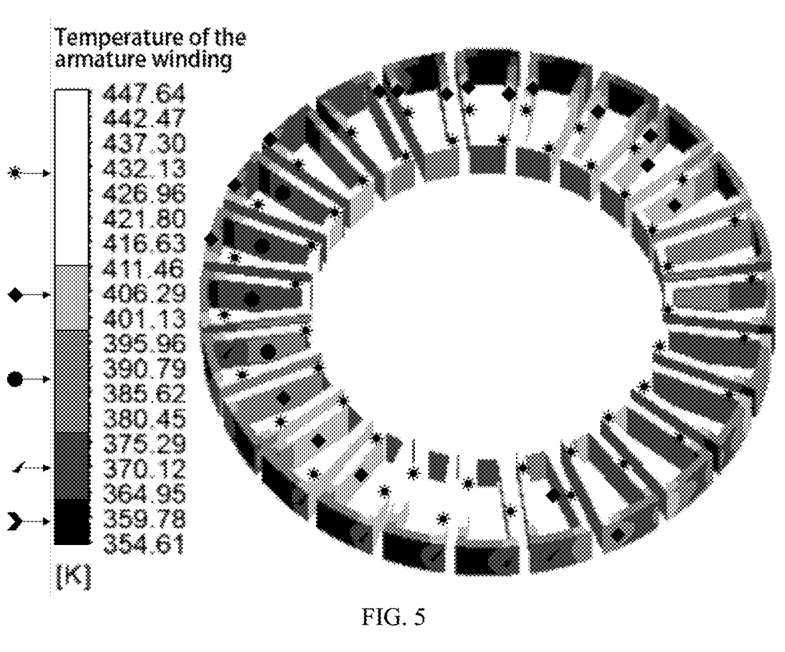
FIG. 5 shows a temperature distribution of an armature winding of a motor stator when only a first circumferential cooling channel is provided.
Figure 6:
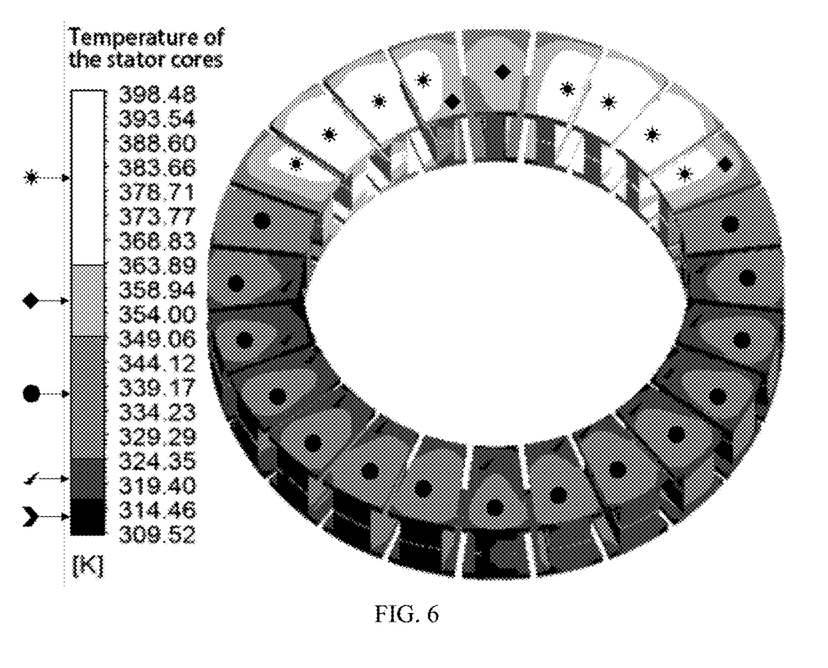
FIG. 6 shows a temperature distribution of stator cores according to the embodiment of the disclosure.
Figure 7:
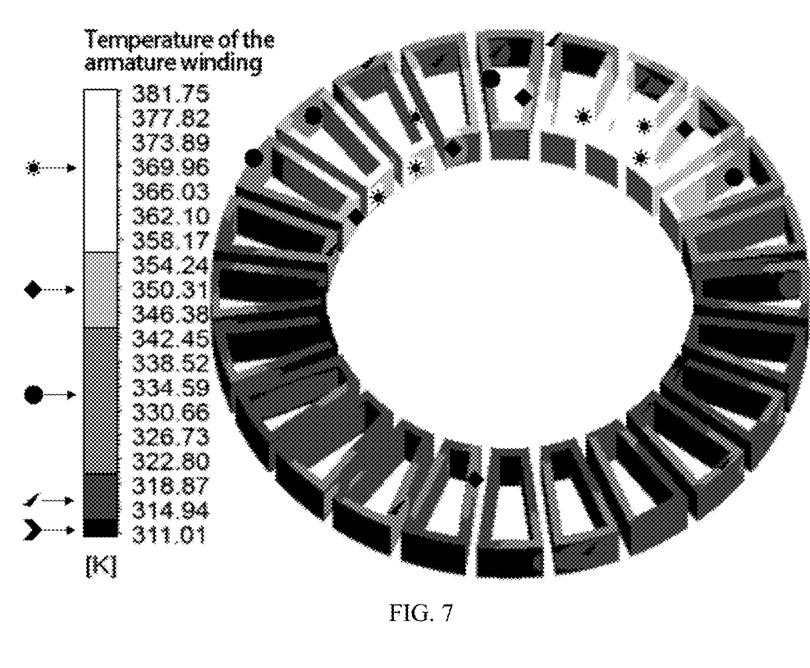
FIG. 7 shows a temperature distribution of an armature winding of according to the embodiment of the disclosure.

A temperature field distribution of the motor calculated by the Fluent software is shown in FIG. 4 to FIG. 7. FIG. 4 and FIG. 5 respectively show the temperature distribution of the stator cores and the armature winding of the motor when only the cooling structure is provided on the surface of the stator bracket. As is be seen from the FIG. 4 and FIG. 5, the highest temperature of the stator cores and the armature winding is located at the inner diameter of the motor, and the highest temperature rise is 469.76 K and 447.64 K respectively. FIG. 6 and FIG. 7 respectively shows the temperature distribution of the stator cores and the armature winding of the motor according to the cooling structure of the present embodiment. As is seen from the FIG. 6 and FIG. 7 that the highest temperature rise of the stator cores and the armature winding of the motor is 398.48 K and 381.75 K, respectively. Compared with the previous cooling structure, the temperature rise of the motor is significantly reduced, proving the effectiveness of the cooling structure of the present embodiment.

What is claimed is:

1. A stator structure of a stator yokeless disc motor, the stator structure being configured to use a stator liquid cooling structure of the stator yokeless disc motor, wherein the stator structure further comprises stator cores and an armature winding, the stator cores comprise a first stator core and a second stator core, the first stator core and the second stator core are same in structures and are oppositely arranged, the first stator core is in an annular structure comprising a plurality of first stator tooth shoes and a plurality of first stator tooth bodies, and the first stator tooth bodies are integrally arranged on one side of the first stator tooth shoes facing the second stator core, the second stator core is in an annular structure comprising a plurality of second stator tooth shoes and a plurality of second stator tooth bodies, and the second stator tooth bodies are integrally arranged on one side of the second stator tooth shoes facing the first stator core, both the first stator tooth bodies and the second stator tooth bodies are wound with the armature winding, and the first stator tooth bodies and the second stator tooth bodies wound with the armature winding are correspondingly inserted into gaps between adjacent blade-shaped cavities in the stator liquid cooling structure of the stator yokeless disc motor;

the stator liquid cooling structure of the stator yokeless disc motor comprises a stator bracket and a water jacket; the stator bracket is annular, and the stator bracket comprises an annular groove arranged on an outer periphery, radial cooling channel sheets, two baffle plates, a second circumferential cooling channel disc and a third circumferential cooling channel disc, an outer periphery of the annular groove is fixedly connected with the water jacket and an annular space is formed between the annular groove and the water jacket, the annular space is a first circumferential cooling channel, opposite upper and lower ends of the water jacket are provided with a liquid inlet and a liquid outlet, the first circumferential cooling channel is provided with the two baffle plates opposite to each other, a connecting line between the liquid inlet and the liquid outlet and a connecting line between the two baffle plates are mutually equally divided and perpendicular, the first circumferential cooling channel is divided into two cavities by the two baffle plates, one cavity is communicated with the liquid inlet and an other cavity is communicated with the liquid outlet, a plurality of the radial cooling channel sheets are arranged at a bottom of a groove body of the annular groove in a circumferential array towards a center of the stator bracket, one end of each of the radial cooling channel sheets is communicated with the annular groove, and an other end of the each of the radial cooling channel sheets is closed; the second circumferential cooling channel disc and the third circumferential cooling channel disc are same in structures, are both annular disc structures, and are symmetrically arranged on both sides of the annular groove, the second circumferential cooling channel disc and the third circumferential cooling channel disc both comprise a plurality of the blade-shaped cavities in a circumferential array along annular discs, and ends of the plurality of the blade-shaped cavities facing centers of the annular discs are communicated, other ends of the plurality of the blade-shaped cavities are fixed on the both sides of the annular groove, and the gaps exist between the adjacent blade-shaped cavities, the blade-shaped cavities corresponding to the second circumferential cooling channel disc and the third circumferential cooling channel disc are communicated through the radial cooling channel sheets.

2. The stator structure of the stator yokeless disc motor according to claim 1, wherein the stator bracket and the water jacket are made of aluminum alloy materials.

3. The stator structure of the stator yokeless disc motor according to claim 1, wherein the stator cores are yokeless stator cores, and a material of the stator cores is one selected from an oriented silicon steel sheet, a non-oriented silicon steel sheet, a soft magnetic composite material and an amorphous alloy material, or two or more materials selected above are mixed to make the stator cores.

4. The stator structure of the stator yokeless disc motor according to claim 1, wherein the armature winding adopts a concentrated winding.

* * * * *